(12) United States Patent
Sbiaa

(10) Patent No.: US 7,173,797 B2
(45) Date of Patent: Feb. 6, 2007

(54) THIN-FILM MAGNETIC HEAD

(75) Inventor: Rachid Sbiaa, Chuo-ku (JP)

(73) Assignee: TDK Corporation, Tokyo (JP)

( * ) Notice: Subject to any disclaimer, the term of this patent is extended or adjusted under 35 U.S.C. 154(b) by 477 days.

(21) Appl. No.: 10/760,669

(22) Filed: Jan. 21, 2004

(65) Prior Publication Data

US 2004/0240124 A1 Dec. 2, 2004

(30) Foreign Application Priority Data

May 27, 2003 (JP) .............................. 2003-149844

(51) Int. Cl.
*G11B 5/33* (2006.01)
(52) U.S. Cl. ............................... 360/324.11; 360/324.1
(58) Field of Classification Search .......... 360/324.11, 360/324.1, 324.12, 324, 322
See application file for complete search history.

(56) References Cited

U.S. PATENT DOCUMENTS

| 6,556,390 | B1 * | 4/2003 | Mao et al. ................ 360/324.1 |
| 6,560,077 | B2 * | 5/2003 | Fujiwara et al. ......... 360/324.1 |
| 6,661,622 | B1 * | 12/2003 | Pinarbasi ................. 360/324.1 |
| 6,707,649 | B2 * | 3/2004 | Hasegawa et al. ..... 360/324.12 |
| 6,765,769 | B2 * | 7/2004 | Mizuguchi ............. 360/324.11 |
| 6,873,500 | B2 * | 3/2005 | Hasegawa et al. ..... 360/324.11 |
| 2002/0054461 | A1 * | 5/2002 | Fujiwara et al. ......... 360/324.1 |
| 2003/0021071 | A1 * | 1/2003 | Kula et al. ................ 360/324.1 |
| 2004/0042127 | A1 * | 3/2004 | Hoshiya et al. ............. 360/322 |

FOREIGN PATENT DOCUMENTS

| JP | A 2002-157711 | 5/2002 |
| JP | A 2002-232035 | 8/2002 |
| JP | A 2003-8108 | 1/2003 |

* cited by examiner

*Primary Examiner*—Tianjie Chen
(74) *Attorney, Agent, or Firm*—Oliff & Berridge, PLC

(57) ABSTRACT

The thin-film magnetic head of the present invention is a CPP type head and comprises an anti-ferromagnetic layer, a pinned layer, a free layer, and a nonmagnetic layer disposed between the pinned layer and the free layer. The pinned layer is provided with a multilayer part comprising a first layer formed from Cu; a second layer formed from Cu and disposed closer to the free layer than is the first layer; and an intermediate layer. The intermediate layer is disposed between the first and second layers while in contact therewith, and is formed with a partly oxidized ferromagnetic layer.

10 Claims, 10 Drawing Sheets

THIN-FILM MAGNETIC HEAD

BACKGROUND OF THE INVENTION

1. Field of the Invention

The present invention relates to a thin-film magnetic head, head gimbal assembly, hard disk drive, and magnetoresistive device for reading magnetic information from a hard disk or the like by utilizing a magnetoresistance effect.

2. Related Background Art

Various studies have recently been under way in order to realize higher sensitivity in thin-film magnetic heads (see, for example, Japanese Patent Application Laid-Open No. 2002-232035, No. 2003-8108 and No. 2002-157711). Japanese Patent Application Laid-Open No. 2002-232035 discloses a specular head improved upon a spin valve head. This specular head utilizes specular reflection at the interface between a very thin oxide layer (NOL: Nano Oxide Layer) and a metal layer, so as to increase further the resistance change. Japanese Patent Application Laid-Open No. 2003-8108 discloses a technique in which a current restriction layer comprising electrically insulating and conductive parts mixed with each other is disposed on the upper or lower face of a free magnetic layer, so as to improve output signal. Japanese Patent Application Laid-Open No. 2002-157711 discloses a technique in which a ferromagnetic layer on the free side (free layer), a nonmagnetic intermediate layer, a ferromagnetic layer on the fixed side (pinned layer), and an insulating layer are disposed in this order, so as to improve reproduction output.

SUMMARY OF THE INVENTION

While various studies have been proposed in order to attain a high magnetoresistance ratio (MR ratio) as mentioned above, it has become necessary for the inventors to further improve the magnetoresistance ratio of thin-film magnetic heads in order to follow the recording density of hard disks remarkably increasing year by year.

It is an object of the present invention to provide a thin-film magnetic head, head gimbal assembly, hard disk drive, and magnetoresistive device with an improved resistance change.

For achieving the above-mentioned object, the present invention provides a thin-film magnetic head comprising an antiferromagnetic layer; a pinned layer exchange-coupled to the antiferromagnetic layer so as to have a fixed magnetization direction; a free layer having a magnetization direction changeable depending on an external magnetic field; and a nonmagnetic layer disposed between the pinned layer and the free layer; wherein a sense current flows in a thickness direction of the free layer; the pinned layer including a multilayer part comprising a first layer formed from Cu; a second layer formed from Cu and disposed closer to the free layer than is the first layer; and an intermediate layer, disposed between the first and second layers while in contact therewith, comprising a partly oxidized ferromagnetic layer.

While an interface between Cu and a ferromagnetic layer enhances the magnetoresistance ratio, an intermediate layer comprising a partly oxidized ferromagnetic layer is held between first and second layers formed from Cu, and thus formed multilayer part is included in a pinned layer in this aspect of the present invention. This provides a greater number of interfaces between Cu and the ferromagnetic layer, thereby improving the resistance change.

Also, the above-mentioned multilayer part is included in the pinned layer instead of layers sensing external magnetic fields such as a free layer. Therefore, the multilayer part does not become a factor lowering the sensing level for external magnetic fields from a hard disk and the like. The pinned layer composed of a multilayer stack will not affect the softness and magneto-striction of the free layer.

Preferably, in the thin-film magnetic head in accordance with this aspect of the present invention, the oxidized part in the intermediate layer of the multilayer part is a ferromagnetic material. In this case, the amount of ferromagnetic material in the pinned layer becomes greater, thereby improving the magnetoresistance change ratio. Examples of materials exhibiting a ferromagnetic characteristic in an oxidized state as such include $\gamma$-$Fe_2O_3$, $\gamma$-$(FeCo)_2O_3$, $Fe_3O_4$, and $(FeCo)_3O_4$.

Preferably, the intermediate layer of the multilayer part is formed from Fe or FeCo. When oxidized, these materials are likely to become $\gamma$-$Fe_2O_3$, $\gamma$-$(FeCo)_2O_3$, $Fe_3O_4$, $(FeCo)_3O_4$, and the like which are ferromagnetic materials. Therefore, as mentioned above, the amount of ferromagnetic material in the pinned layer becomes greater, thereby improving the magnetoresistance change ratio.

Preferably, in the thin-film magnetic head in accordance with this aspect of the present invention, the pinned layer comprises a first ferromagnetic layer exchange-coupled to the antiferromagnetic layer so as to have a fixed magnetization direction while in contact with the antiferromagnetic layer, a second ferromagnetic layer having a magnetization direction opposite from that of the first ferromagnetic layer, and a nonmagnetic spacer layer disposed between the first and second ferromagnetic layers; the multilayer part being included in the second ferromagnetic layer.

Namely, when the pinned layer of the thin-film magnetic head employs a so-called synthetic structure, the multilayer part is preferably included in the second ferromagnetic layer. Since the second ferromagnetic layer positioned closer to the free layer influences the magnetoresistance change more than the first ferromagnetic layer does, such a configuration can improve the resistance change. Here, the synthetic structure can reduce the leakage magnetic field extending from the pinned layer to the free layer.

Preferably, a plurality of multilayer parts is provided in the pinned layer. Increasing the number of multilayer parts can further enhance the effects mentioned above, thereby improving the resistance change.

In another aspect, the present invention provides a thin-film magnetic head comprising an antiferromagnetic layer; a pinned layer exchange-coupled to the antiferromagnetic layer so as to have a fixed magnetization direction; a free layer having a magnetization direction changeable depending on an external magnetic field; and a nonmagnetic layer made of Cu and disposed between the pinned layer and the free layer; wherein a sense current flows in a thickness direction of the free layer; the pinned layer including a multilayer part comprising a first layer formed from Cu; and an intermediate layer, disposed between the first layer and nonmagnetic layer while in contact therewith, comprising a partly oxidized ferromagnetic layer.

In this aspect of the present invention, the nonmagnetic layer is formed from Cu, whereby the thin-film magnetic head becomes a GMR head. Also, a multilayer part comprising three layers of the first layer and intermediate layer in the pinned layer, and the nonmagnetic layer made of Cu, which are successively laminated, is formed. Namely, as compared with the former aspect of the present invention, the second layer of the multilayer part and the nonmagnetic layer are combined together, whereby the manufacturing process can be simplified while the sensor part of the thin-film magnetic head can be made thinner.

Also, the present invention provides a thin-film magnetic head comprising an antiferromagnetic layer; a pinned layer exchange-coupled to the antiferromagnetic layer so as to have a fixed magnetization direction; a free layer having a magnetization direction changeable depending on an external magnetic field; and a nonmagnetic layer disposed between the pinned layer and the free layer; wherein a sense current flows in a thickness direction of the free layer; the pinned layer including a multilayer part comprising a first layer formed from a nonmagnetic electrically conductive layer; a second layer formed from a nonmagnetic electrically conductive layer and disposed closer to the free layer than is the first layer; and an intermediate layer, disposed between the first and second layers while in contact therewith, comprising a partly oxidized ferromagnetic layer.

The nonmagnetic electrically conductive layer constituting the first and second layers of the multilayer part may be not only Cu but also, for example, one of Al, Ag, Ru, Rh, Hf, Pt, Zn, Ti, and Cr or an alloy of at least two kinds thereof. Using these materials can also improve the magnetoresistance ratio.

Further, the present invention provides a head gimbal assembly and hard disk drive each comprising a thin-film magnetic head mentioned above, thereby being able to yield a high magnetoresistance ratio. The head gimbal assembly and hard disk drive in accordance with the present invention may comprise any characteristic feature of the thin-film magnetic heads mentioned above.

Also, the present invention provides a magnetoresistive device comprising an antiferromagnetic layer; a pinned layer exchange-coupled to the antiferromagnetic layer so as to have a fixed magnetization direction; a free layer having a magnetization direction changeable depending on an external magnetic field; and a nonmagnetic layer disposed between the pinned layer and the free layer; wherein a sense current flows in a thickness direction of the free layer; the pinned layer including a multilayer part comprising a first layer formed from a nonmagnetic electrically conductive layer; a second layer formed from a nonmagnetic electrically conductive layer and disposed closer to the free layer than is the first layer; and an intermediate layer, disposed between the first and second layers while in contact therewith, comprising a partly oxidized ferromagnetic layer. As stated in the explanation of the above-mentioned thin-film magnetic head, this magnetoresistive device yields a high resistance change.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

In the following, preferred embodiments of the present invention will be explained in detail with reference to the accompanying drawings. Constituents identical to each other will be referred to with numerals identical to each other without repeating their overlapping explanations.

Figure 1:
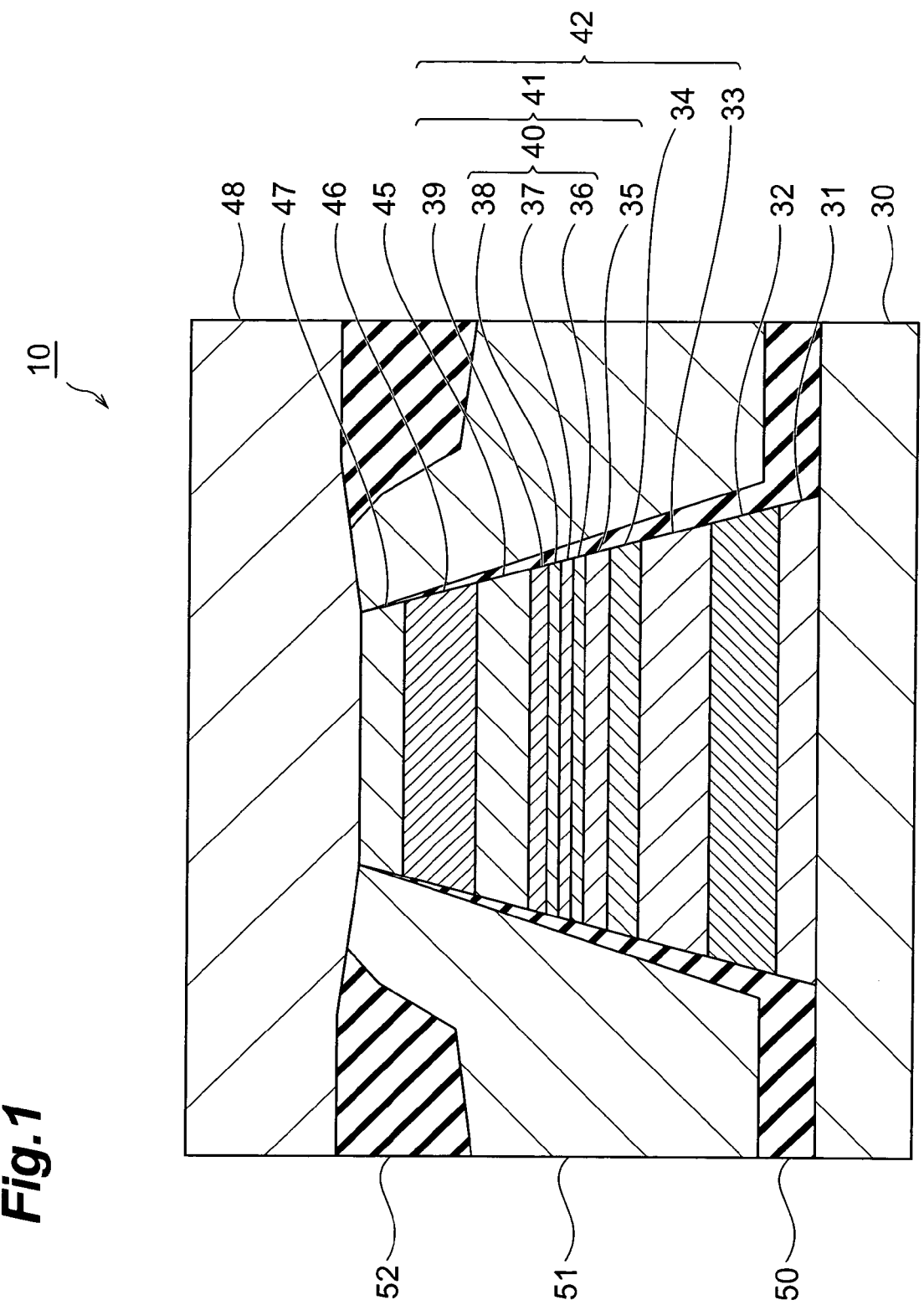
FIG. 1 is a view showing a first embodiment of the thin-film magnetic head in accordance with the present invention.

[First Embodiment] FIG. 1 is a view schematically showing a thin-film magnetic head in accordance with an embodiment, illustrating the vicinity of an area slightly inside of its surface (hereinafter referred to as air bearing surface (ABS)) opposing a recording medium. This thin-film magnetic head 10 is a GMR head utilizing giant magnetoresistance effect. Successively laminated on a lower electrode layer 30 formed on a substrate (not depicted) are a buffer layer 31, an antiferromagnetic layer 32, a pinned layer 42 having a substantially three-layer structure exchange-coupled to the antiferromagnetic layer 32 so as to have a fixed magnetization direction, a nonmagnetic electrically conductive layer 45, a free layer 46 having a magnetization direction changeable depending on an external magnetic field, and a cap layer 47.

The thin-film magnetic head 10 employs a so-called CPP (Current Perpendicular to Plane) structure in which a sense current $I_S$ flows in a layer thickness direction of the free layer 46. By way of a pair of electrode layers, the sense current $I_S$ is supplied to an MR film constituted by the free layer 46, nonmagnetic electrically conductive layer 45, pinned layer 42, and the like. As the electrode layers, the above-mentioned lower electrode layer 30 and an upper electrode layer 48 are provided. The upper electrode layer 48 is formed so as to cover the cap layer 47.

Formed about the laminate from the antiferromagnetic layer 32 to the cap layer 47 is a hard bias layer 51 for turning the free layer 46 into a single domain. Disposed between the hard bias layer 51 and the lower electrode layer 30 is an insulating layer 50. Further, an insulating layer 52 is provided between the hard bias layer 51 and the upper electrode layer 48. The insulating layers 50, 52 can be formed from $Al_2O_3$ or the like, and prevent the sense current $I_S$ from leaking. The magnetoresistive device of this embodiment is constituted by the layers from the antiferromagnetic layer 32 to the free layer 46, the insulating layer 50, and the hard bias layer 51.

Configurations of the individual layers will now be explained in detail. The lower electrode layer 30 can be formed from an electrically conductive material such as Cu, Ta, Au, Al, NiFe, or NiFeCr, for example. The buffer layer 31 is formed on the lower electrode layer 30 from an electrically conductive material such as Cu, Ta, NiFe, or NiFeCr, for example, with a thickness of about 1 nm to about 10 nm, for example. It can be a single layer or composed of multilayers. The upper electrode layer 48 can be formed from a material similar to that of the lower electrode layer 30.

The antiferromagnetic layer 32 is for pinning the magnetization direction of the pinned layer 42. The ferromagnetic layer 32 has a thickness of about 5 nm to about 20 nm, and can be formed from PtMn, IrMn or the like. The material exhibition an antiferromagnetic structure even without heat treatment, thereby inducing an exchange-coupled magnetic field between it and a ferromagnetic material, or a type exhibiting antiferromagnetism upon heat treatment.

The pinned layer 42 comprises a first ferromagnetic layer 33 in contact with the antiferromagnetic layer 32, a second ferromagnetic layer 41 having a magnetization direction opposite from that of the first ferromagnetic layer 33, and a nonmagnetic spacer layer 34 disposed between the layers 33 and 41, thus yielding a so-called synthetic structure. Such a synthetic structure can reduce unnecessary leakage magnetic fields extending from the pinned layer 42 to the free layer 46.

The first ferromagnetic layer 33 can be formed from Co, CoFe, NiFe, CoFeNi, or the like, for example. The second ferromagnetic layer 41 is configured such that the laminate part 40 having a three-layer structure is held between a lower ferromagnetic layer 35 positioned on the nonmagnetic spacer layer 34 side and an upper ferromagnetic layer 39 positioned on the nonmagnetic electrically conductive layer 45 side. The lower ferromagnetic layer 35 and upper ferromagnetic layer 39 can be formed from Co, CoFe, NiFe, CoFeNi, or the like, for example.

The nonmagnetic spacer layer 34 is formed from a nonmagnetic material such as Ru, Rh, Re, Cr, or Zr, for example, with a thickness of about 0.2 nm to about 1.2 nm, for example. The nonmagnetic spacer layer 34 generates antiferromagnetic exchange coupling between the first ferromagnetic layer 33 and the second ferromagnetic layer 41, thereby causing the layers 33, 41 to have respective magnetization directions opposite to each other. For example, the magnetization directions of the first and second ferromagnetic layers 33, 41 are fixedly oriented to the front and back sides of the drawing sheet, respectively.

The multilayer part 40 included in the second ferromagnetic layer 41 of the pinned layer 42 will now be explained. The multilayer part 40 comprises a first layer 36 made of Cu in contact with the lower ferromagnetic layer 35 thereunder, a second layer 38 made of Cu in contact with the upper ferromagnetic layer 39, and an intermediate layer 37 disposed between the first layer 36 and second layer 38 while in contact therewith. The intermediate layer 37 is made by partly oxidizing a ferromagnetic layer. Here, 'partly' means to encompass not only the case where the oxidized area is smaller than the unoxidized area, but also the case where the former is larger than the latter.

Figure 2:
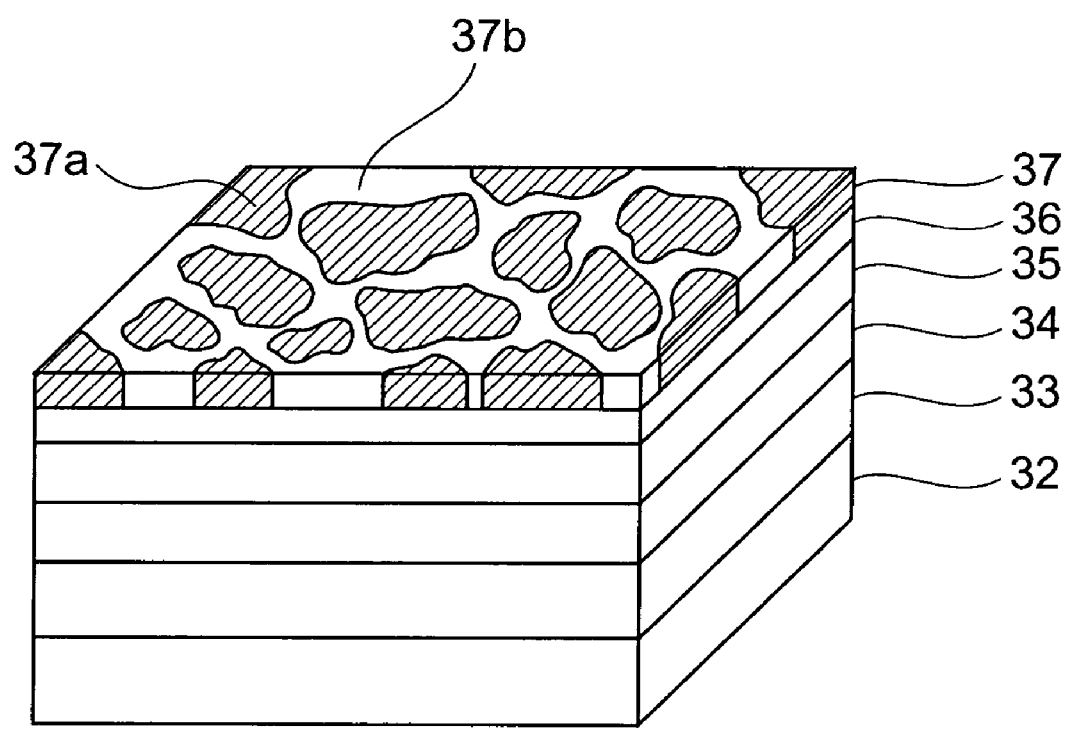
FIG. 2 is a view schematically showing an oxidized state of an intermediate layer in a multilayer part of a pinned layer.

FIG. 2 is a perspective view schematically showing a state of the intermediate layer 37. Hatched regions 37a indicate oxidized areas. Here, the oxidized areas 37a are formed like islands. The unoxidized area 37b remains as a ferromagnetic layer. The ferromagnetic layer to be oxidized to yield the intermediate layer 37 can be formed by Fe or FeCo, for example. On the other hand, the oxidized areas 37a become $Fe_3O_4$, $\gamma$-$Fe_2O_3$, $\alpha$-$Fe_2O_3$, FeO, and the like, among which $Fe_3O_4$ and $\gamma$-$Fe_2O_3$, i.e., ferromagnetic substances, are particularly preferred. This is because of the fact that, when the oxidized areas 37a become a ferromagnetic substance, the amount of ferromagnetic material in the pinned layer 42 (the second ferromagnetic layer 41 in particular) increases, thereby improving the magnetoresistance ratio. Forming the intermediate layer 37 from Fe or FeCo as mentioned above is advantageous in that the layer is likely to become $\gamma$-$Fe_2O_3$, $\gamma$-$(FeCo)_2O_3$, $Fe_3O_4$, and $(FeCo)_3O_4$ when oxidized.

Each of the first layer 36 and second layer 38 made of Cu has a thickness of about 0.1 nm to about 0.5 nm, whereas the intermediate layer has a thickness of about 0.1 nm to about 10 nm. The total film thickness of the first ferromagnetic layer 33 and second ferromagnetic layer 41 is about 1 nm to about 10 nm, for example.

Referring to FIG. 1 again, other layers will be explained. The nonmagnetic electrically conductive layer 45 is disposed between the pinned layer 42 and the free layer 46, and is formed from an electrically conductive material such as Cu. The nonmagnetic electrically conductive layer 45 has a thickness of several nanometers, for example.

The free layer 46, which changes its magnetization direction under the influence of a leakage of magnetic recording medium field such as hard disk, has a thickness of about 1 nm to about 10 nm, and can be formed from a ferromagnetic material such as Co, CoFe, NiFe, CoNiFe, or CoZrNb, for example. The hard bias layer 51 turns the free layer 46 into a single domain, for example, oriented leftward in the drawing. When an air bearing surface approaches a magnetization transition area, the magnetization direction of the free layer 46 shifts so as to approach the back side or front side in the drawing. The resistance value of sense current varies depending on the angle between the respective magnetization directions of the free layer 46 and second ferromagnetic layer 41, whereby binary information of the hard disk can be reproduced according to this value. The hard bias layer 51 can be formed from CoTa, CoCrPt, CoPt, or the like, for example. The cap layer 47 is formed from an electrically conductive material such as Ta, for example.

The foregoing is the configuration of the thin-film magnetic head 10 in accordance with this embodiment. Effects of the thin-film magnetic head 10 will now be explained with reference to FIG. 3. This drawing schematically shows the second ferromagnetic layer 41 in the pinned layer 42. In general, an interface between Cu and a ferromagnetic layer enhances the resistance change. Here, as mentioned above, the second ferromagnetic layer 41 includes the multilayer part 40 having the first layer 36 and second layer 38 each formed from Cu. An interface $S_1$ is formed between the first layer 36 and the lower ferromagnetic layer 35, whereas an interface $S_2$ is formed between the first layer 36 and the unoxidized area 37b in the intermediate layer 37. An interface $S_3$ is formed between the second layer 38 and the unoxidized area 37b in the intermediate layer 37, whereas an interface $S_4$ is formed between the second layer 38 and the upper ferromagnetic layer 39. Namely, a number of (4 in this embodiment) interfaces (interfaces $S_1$ to $S_4$) are provided between Cu and the ferromagnetic layers, whereby the magnetoresistance ratio can be improved remarkably. When the oxidized areas 37a in the intermediate layer 37 have become a ferromagnetic substance such as $Fe_3O_4$ in particular, the interface area between Cu and the ferromagnetic substance becomes greater, whereby a higher magnetoresistance change ratio can be obtained. Here, the lower ferromagnetic layer 35 and the unoxidized area 37b in the intermediate layer 37 have the same magnetization direction fixed, for example, rightward in the drawing.

Because of its insulating property, the oxidized areas 37a of the intermediate layer 37 can narrow the passage of the sense current $I_S$ flowing through the intermediate layer 37. This enhances the effective resistance value, thus increasing the magnetoresistance change amount, whereby a high reproduction output can be obtained.

In addition, the multilayer part 40 is included in the pinned layer 42 instead of layers sensing an external magnetic field such as the free layer 46. Therefore, the existence of the multilayer part 40 can improve the magnetoresistance change without lowering the sensing level for external magnetic fields from the hard disk and the like. In particular, the multilayer part 40 is not included in the first ferromagnetic layer 33 but in the second ferromagnetic layer 41 in the pinned layer 42 in this embodiment. The second ferromagnetic layer 41 located closer to the free layer 46 is more effective in the magnetoresistance change than is the first ferromagnetic layer 33, whereby such a configuration also contributes to improving the magnetoresistance change. Here, it is not always necessary for the pinned layer 42 to employ a synthetic structure.

Though the oxidized areas 37a of this embodiment are formed like islands as shown in FIG. 2, the form of these areas is not restricted thereto as long as an unoxidized area exists to such an extent that a current path is secured. For example, unoxidized areas 37b may be located discretely so as to be separated from each other.

Figure 4:
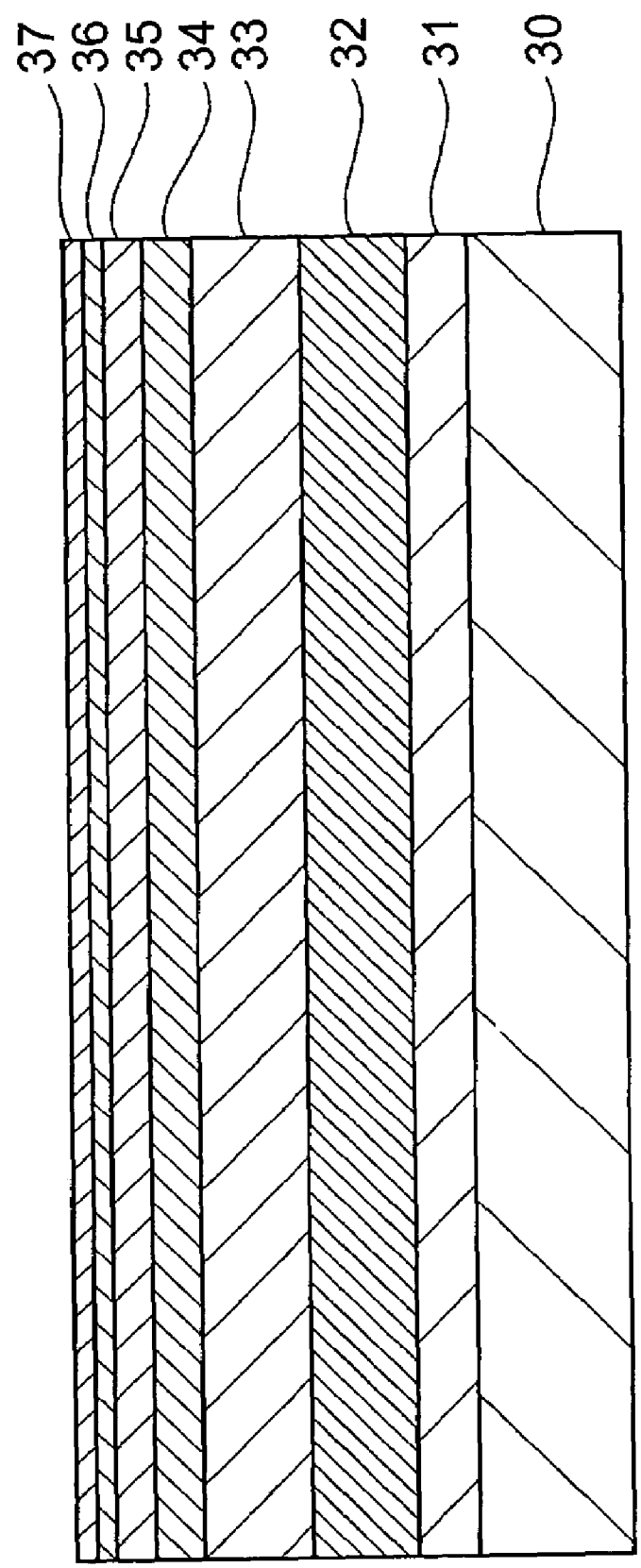
FIG. 4 is a view showing a manufacturing step of a thin-film magnetic head.
Figure 5:
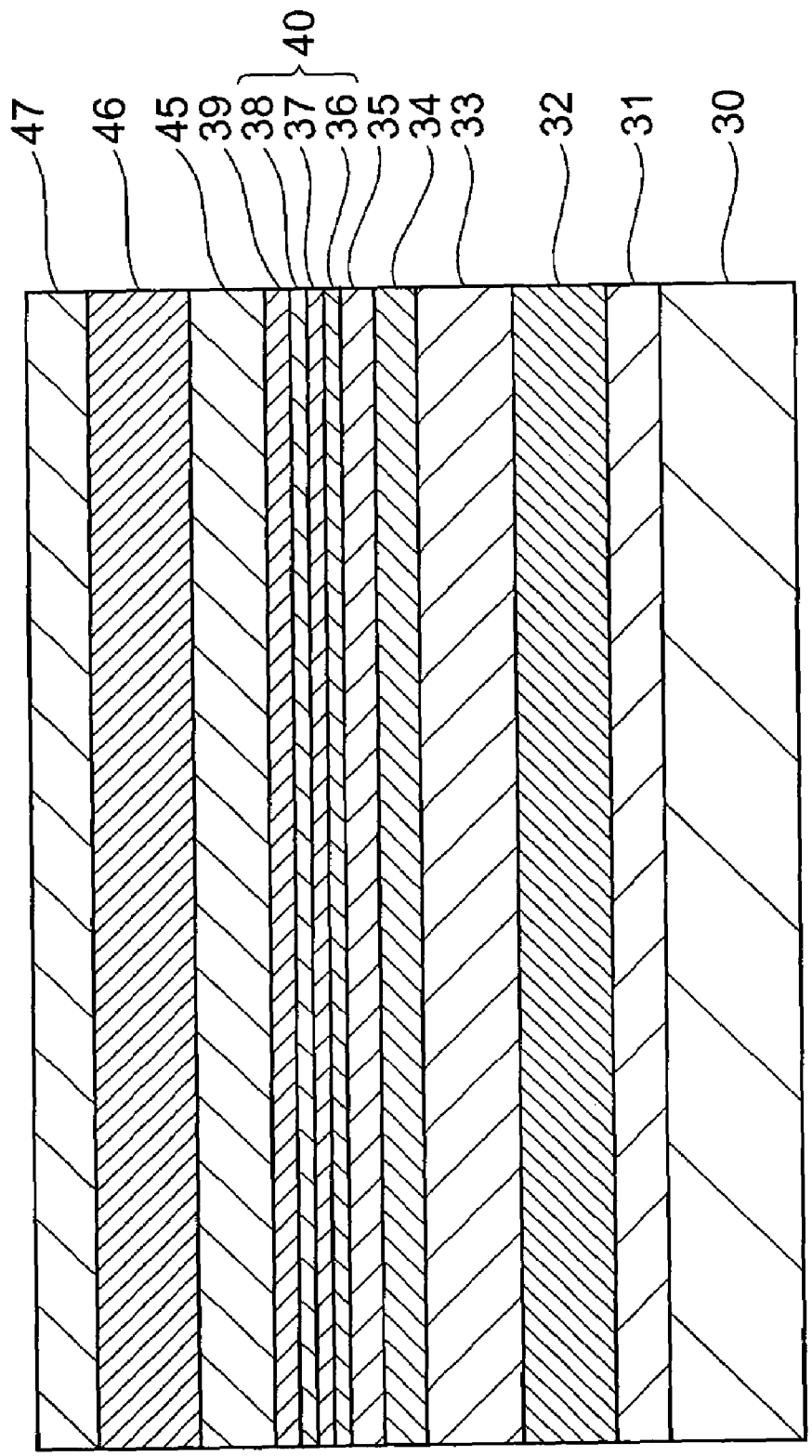
FIG. 5 is a view showing a subsequent manufacturing step.
Figure 6:
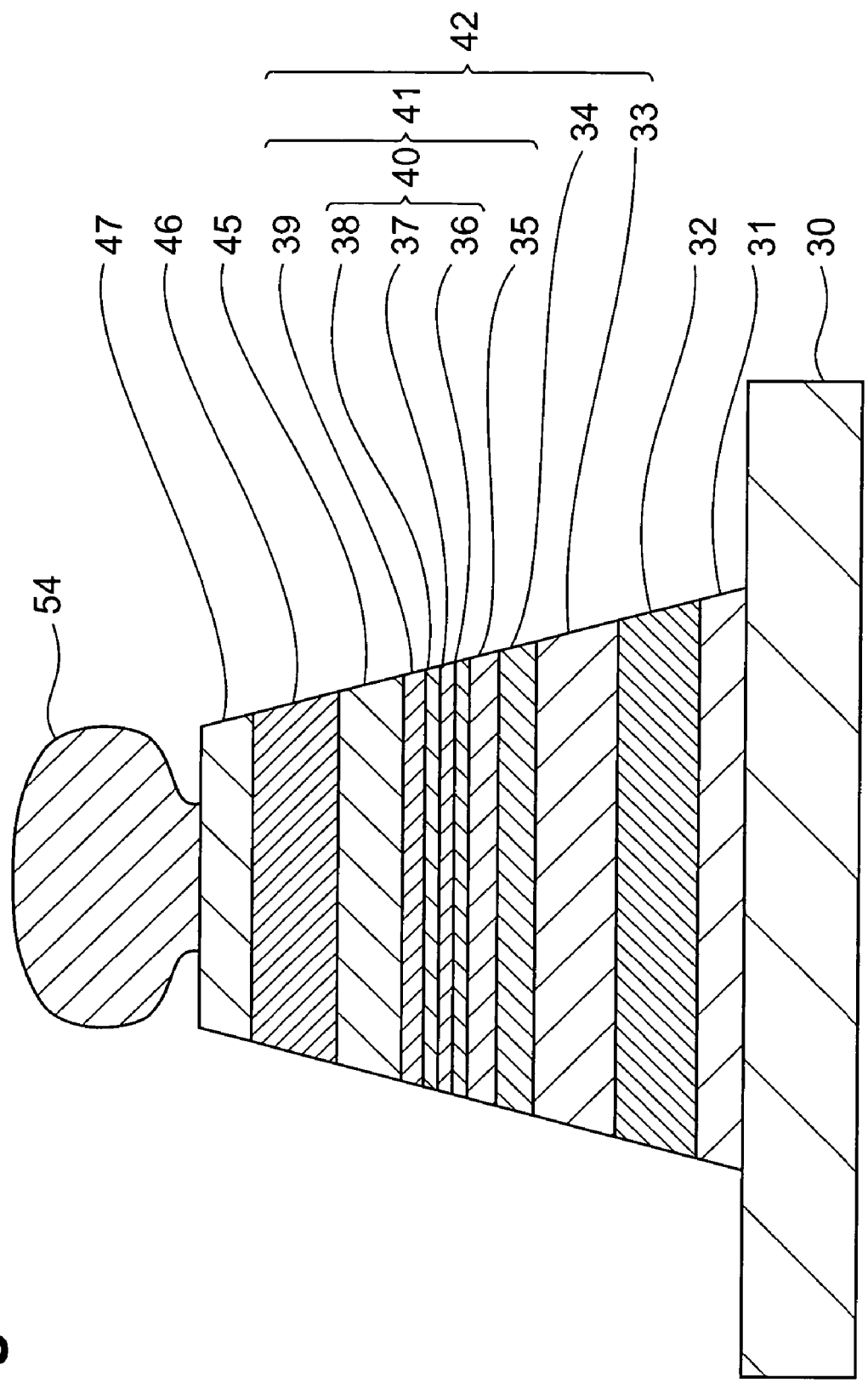
FIG. 6 is a view showing a subsequent manufacturing step.

With reference to FIGS. 4 to 6, a method of making the thin-film magnetic head in accordance with this embodiment will now be explained.

First, on a disk-like substrate which is not depicted, a lower electrode layer 30 is formed by sputtering, plating, ion beam vapor deposition, or the like, for example. Subsequently, a buffer layer 31, an antiferromagnetic layer 32, a first ferromagnetic layer 33, a nonmagnetic spacer layer 34, a lower ferromagnetic layer 35, a first layer 36, and an intermediate layer (a layer to become an intermediate layer by oxidization in the strict sense) 37 are successively laminated by sputtering, for example.

Then, the top layer is subjected to an oxidizing process, so as to form an intermediate layer 37 partly formed with oxidized areas 37a. Employable as the oxidizing method are various techniques such as those introducing an oxygen gas into a chamber containing the laminate in the middle of manufacturing so as to oxidize it naturally, those using ion beams for oxidization, and those utilizing oxygen plasma.

Subsequently, as shown in FIG. 5, a second layer 38, an upper ferromagnetic layer 39, a nonmagnetic electrically conductive layer 45, a free layer 46, and a cap layer 47 are successively laminated by sputtering, for example.

Then, as shown in FIG. 6, a mask 54 is formed on the cap layer 47, and a laminate from the buffer layer 31 to the cap layer 47 is patterned in conformity to the mask form by ion milling, for example. The mask 54 is formed by coating the intermediate surface with a resist which is polymerizable using electron beam or laser irradiation, and then carrying out development. For facilitating liftoff which will be explained later, it is preferred that a depression be formed on the lower side of the mask 54 by a known technique. In the state where the mask 54 remains, an insulating layer 50, a hard bias layer 51, and an insulating layer 52 are successively deposited on the whole surface of the intermediate by sputtering or the like (see FIG. 1).

Subsequently, the mask 54 is removed by liftoff together with the materials deposited on it. Then, as shown in FIG. 1, an upper electrode layer 48 is laminated by sputtering, plating, ion beam vapor deposition, or the like. By using a known through hole forming technique or the like, the upper electrode layer 48 and lower electrode layer 30 are connected to reproducing pads 19a, 19b shown in FIG. 8, respectively.

In the foregoing manner, a reproducing head section of the thin-film magnetic head is obtained. Though not explained in detail, an inductive recording head section is formed on the reproducing head section. The recording head section may be either for longitudinal recording in which a thin-film coil is held between upper and lower magnetic poles, or for perpendicular recording in which a thin-film coil is held between main and auxiliary magnetic poles.

After an intermediate of the thin-film magnetic head is produced on the substrate by forming the recording head section, a plurality of bars are prepared by dicing. Each bar comprises a plurality of thin-film magnetic head intermediates arranged in parallel. At a stage where such a bar is prepared, lapping (polishing) for adjusting the MR height is carried out. After the lapping, each bar is cut into blocks each having a thin-film magnetic head, so as to form a slider rail, thereby yielding a so-called head slider. This completes a series of manufacturing steps for the thin-film magnetic head 10.

Though this embodiment relates to a case where the thin-film magnetic head 10 is a so-called CPP-GMR head, the thin-film magnetic head may be a TMR head as well. In the latter case, the nonmagnetic layer between the free layer and the pinned layer is a tunnel barrier layer formed from an insulating material. The tunnel barrier layer is one through which electrons can pass while keeping their spins by tunneling effect. It has a thickness of about 0.5 nm to about 2 nm, and can be formed from an insulating material such as $Al_2O_3$, NiO, MgO, $Ta_2O_5$, $TiO_2$, or HfO, for example.

Figure 3:
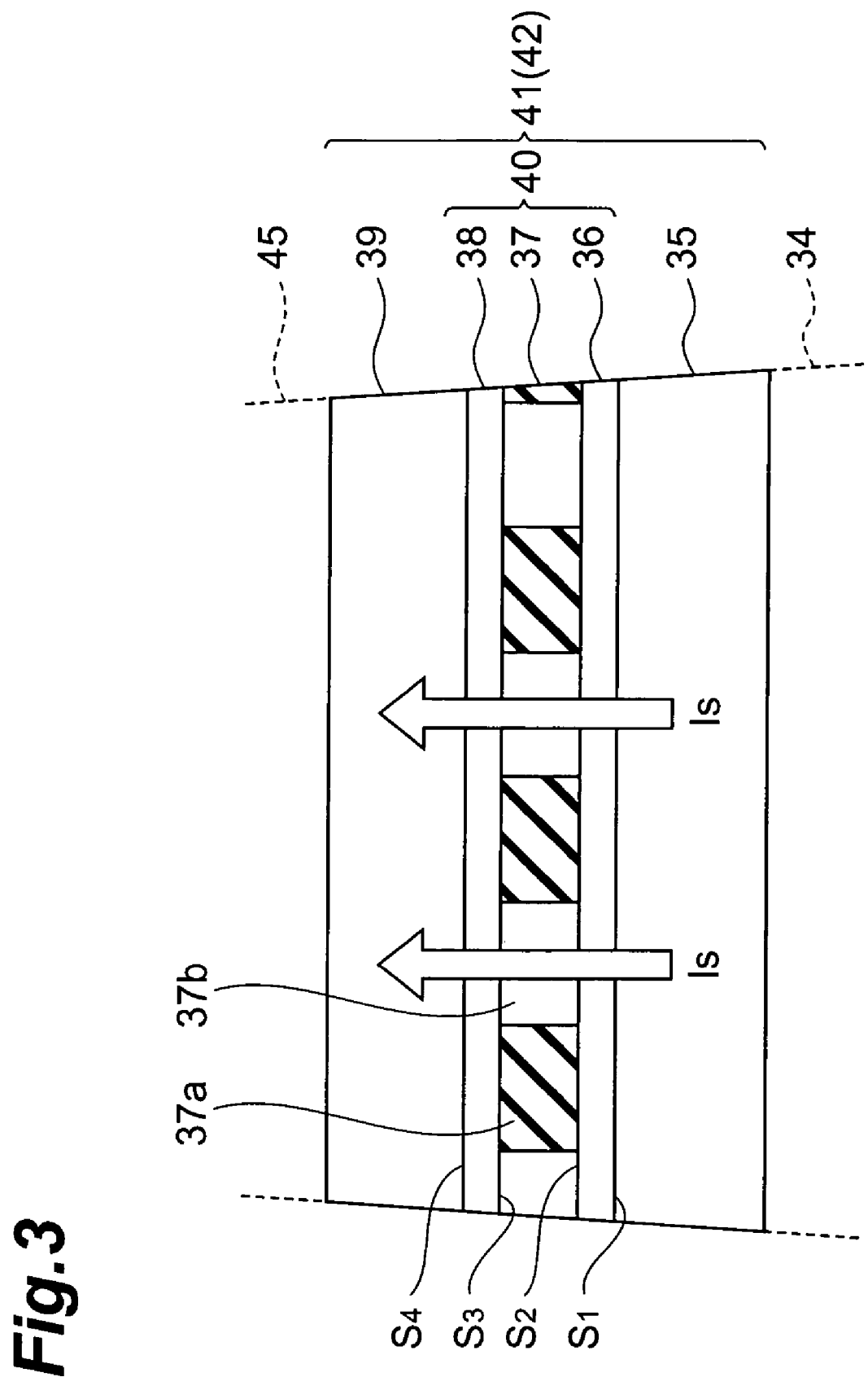
FIG. 3 is an enlarged view of the multilayer part and its vicinity.

The sense current $I_S$ may flow in the direction opposite from that shown in FIG. 3, i.e., from the free layer 46 to the pinned layer 42.

A head gimbal assembly and hard disk drive equipped with the above-mentioned thin-film magnetic head 10 will now be explained.

Figure 7:
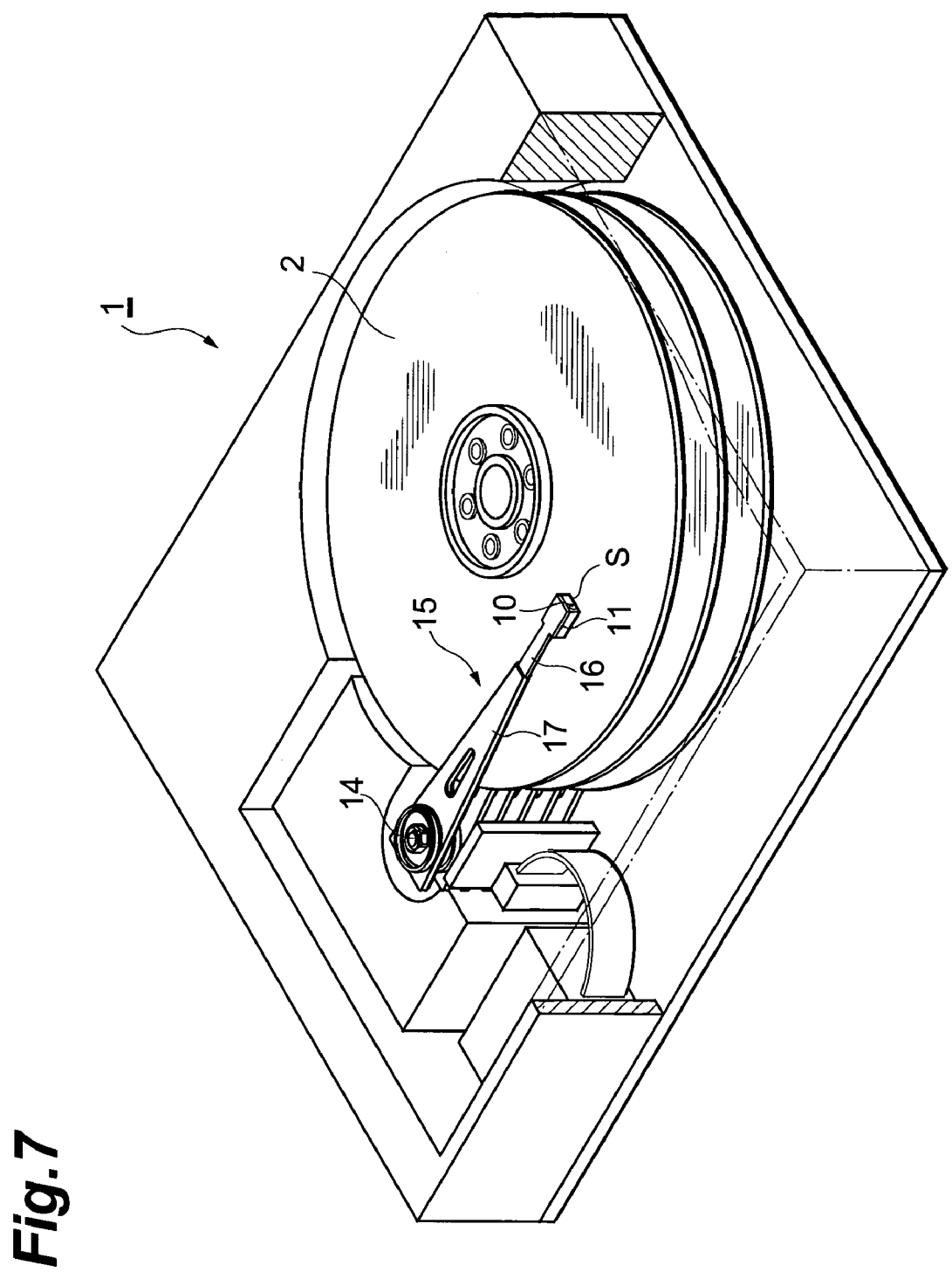
FIG. 7 is a view showing an embodiment of the hard disk drive in accordance with the present invention.

FIG. 7 is a view showing a hard disk drive equipped with the thin-film magnetic head 10. The hard disk drive 1 actuates a head gimbal assembly (HGA) 15, so as to cause the thin-film magnetic head 10 to record and reproduce magnetic information with respect to a recording surface of a hard disk 2 rotating at a high speed. The head gimbal assembly 15 comprises a gimbal 16 mounted with a head slider 11 formed with the thin-film magnetic head 10, and a suspension arm 17 connected thereto, and is rotating around a shaft 14 using a coil motor, for example. When the head gimbal assembly 15 is rotated, the head slider moves radially of the hard disk 2, i.e., in a direction traversing track lines.

Figure 8:
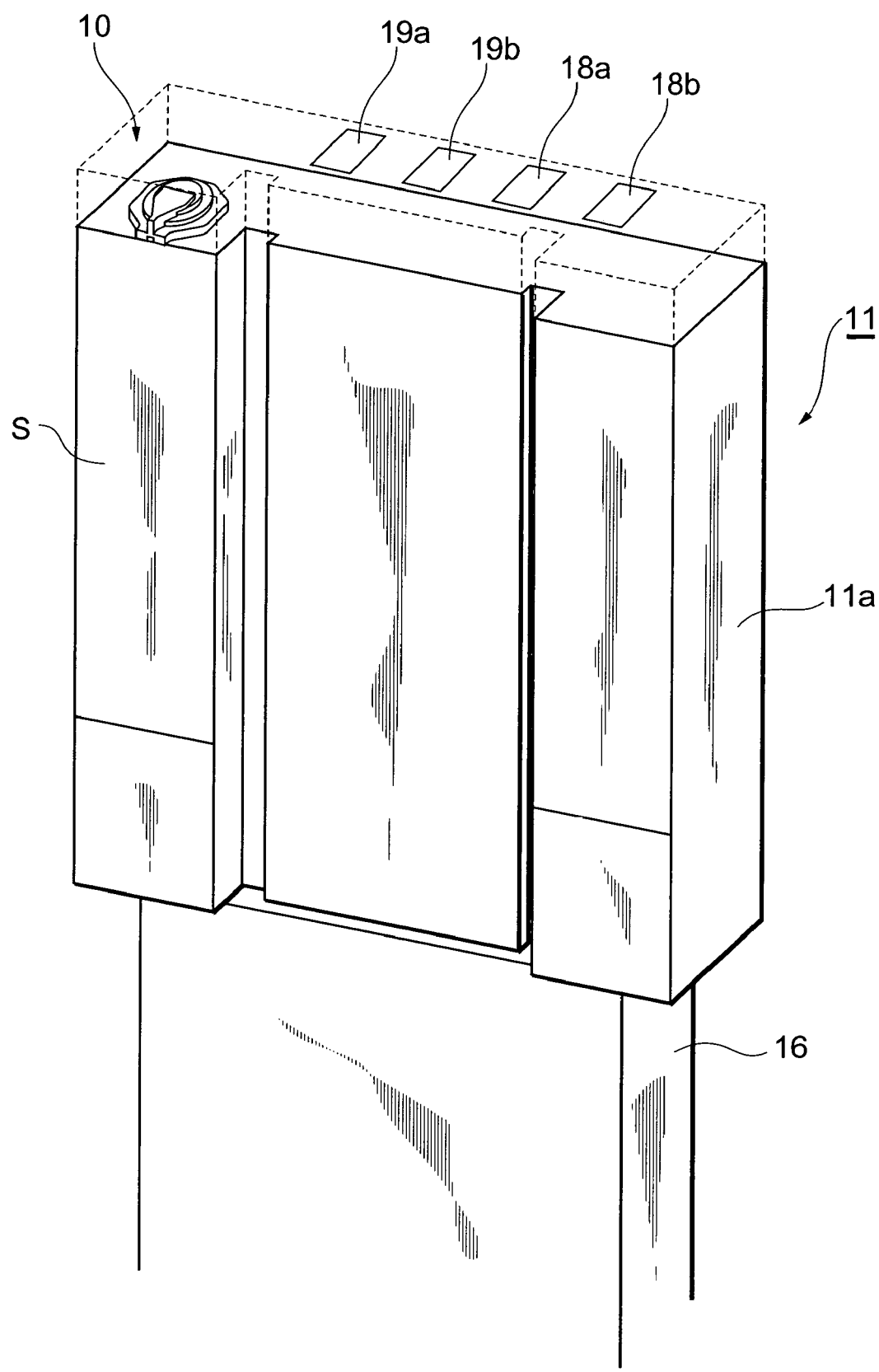
FIG. 8 is a perspective view showing an embodiment of the head slider in accordance with the present invention.

FIG. 8 is an enlarged perspective view of the head slider 11. The head slider 11 has a substantially rectangular parallelepiped form, whereas the thin-film magnetic head 10 is formed on a support 11a. The surface on the front side of the drawing is an air bearing surface S opposing the recording surface of the hard disk 2. As the hard disk 2 rotates, an airflow caused by the rotation floats up the head slider 11, whereby the air bearing surface S is separated from the recording surface of the hard disk 2. Recording pads 18a, 18b and reproducing pads 19a, 19b are connected to the thin-film magnetic head 10, whereas wires (not depicted) for inputting/outputting electric signals, to be connected to the pads, are attached to the suspension arm 17 shown in FIG. 7. The recording pads 18a, 18b are electrically connected to the thin-film coil of the recording head section, whereas the reproducing pads 19a, 19b are electrically connected to the upper and lower electrode layers 48, 30 of the reproducing head section, respectively.

Such a head gimbal assembly 15 and hard disk drive 1 can realize a high magnetoresistance ratio since they are equipped with the above-mentioned thin-film magnetic head 10, thereby enabling the hard disk drive to yield a high reproduction output.

Figure 9:
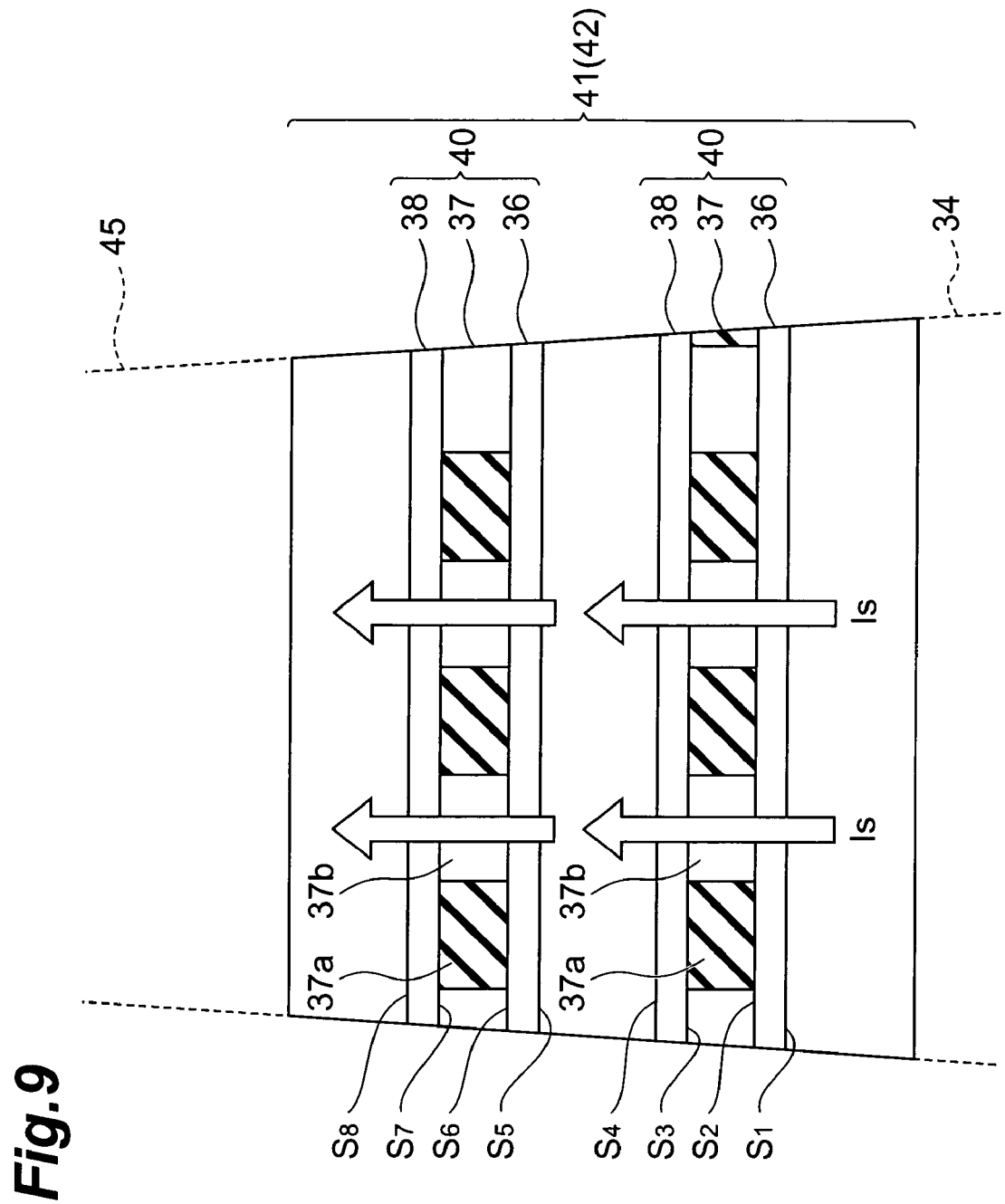
FIG. 9 is a view showing a second embodiment of the thin-film magnetic head in accordance with the present invention.

[Second Embodiment] A second embodiment of the present invention will now be explained with reference to FIG. 9. In this embodiment, the second ferromagnetic layer 41 in the pinned layer 42 is formed with two multilayer parts 40. More specifically, ferromagnetic layers made of FeCo or the like are disposed between the lower multilayer part 40 and the nonmagnetic spacer layer 34, between the two multilayer parts 40, and between the upper multilayer part 40 and the nonmagnetic electrically conductive layer 45, respectively. When such a configuration is employed, the number of interfaces $S_1$ to $S_8$ between Cu and ferromagnetic substances is 8, thus being greater than that in the first embodiment, whereby the magnetoresistance ratio can be improved.

In a modified example of this embodiment, no ferromagnetic layer is disposed between the two multilayer parts 40. For providing a greater number of interfaces between Cu and ferromagnetic substances, however, the embodiment shown in FIG. 9 is preferable.

Figure 10:
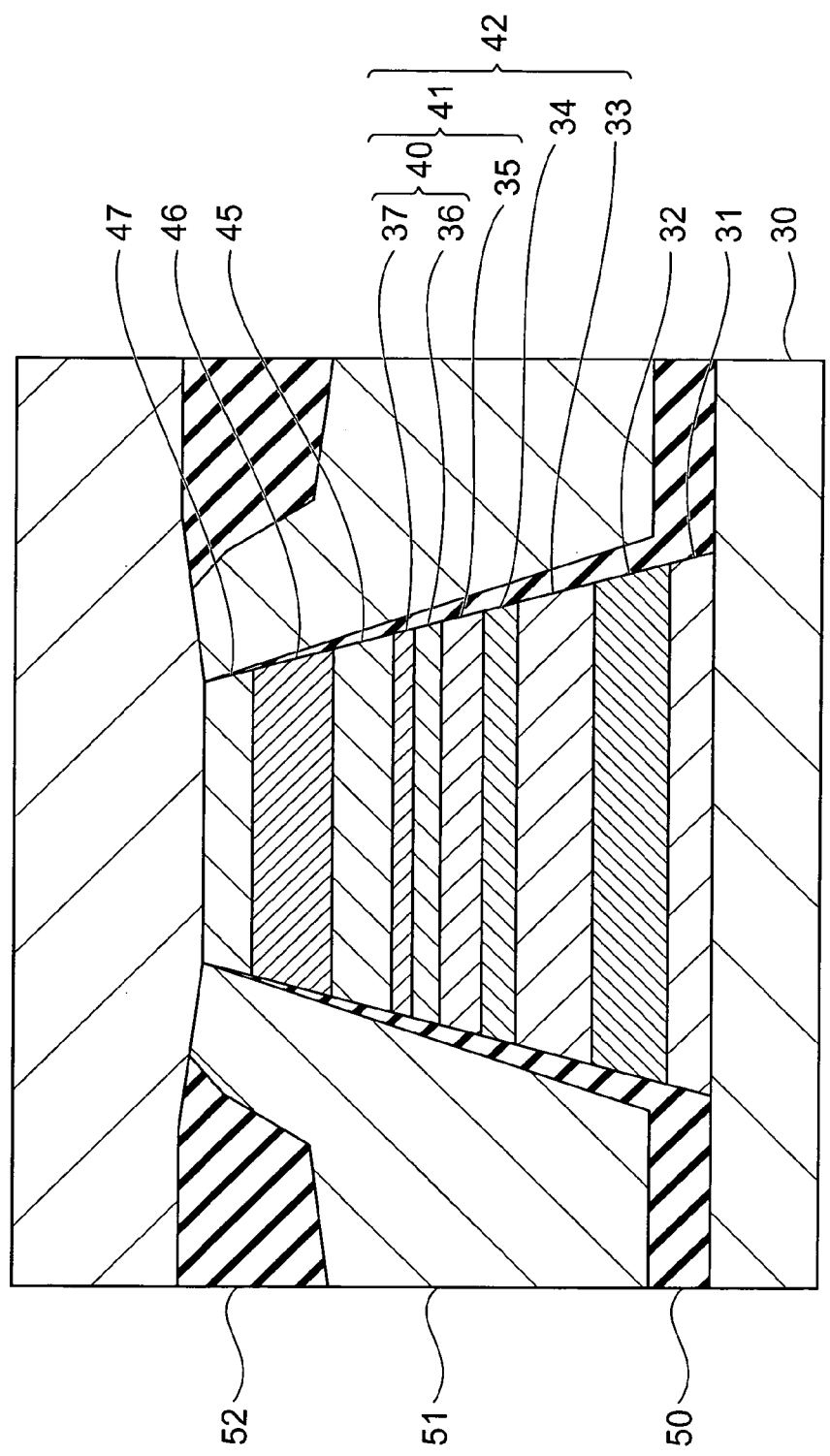
FIG. 10 is a view showing a third embodiment of the thin-film magnetic head in accordance with the present invention.

[Third Embodiment] With reference to FIG. 10, a third embodiment of the present invention will now be explained. The thin-film magnetic head 10 in this embodiment is a CPP type GMR head in which a buffer layer 31, an antiferromagnetic layer 32, a pinned layer 42 having a substantially three-layer structure, a nonmagnetic electrically conductive layer 45, a free layer 46, and a cap layer 47 are successively laminated on a lower electrode layer 30 on a substrate. Materials of the layers other than the pinned layer 42 are the same as those of the first embodiment.

The pinned layer 42 comprises a multilayer part 40 including a first layer 36 made of Cu, and an intermediate layer 37 disposed between the first layer 36 and the nonmagnetic electrically conductive layer 45 made of Cu while in contact with these layers. As in the first embodiment, the intermediate layer 37 is formed by partly oxidizing a ferromagnetic layer such as FeCo.

In such a thin-film magnetic head, the first layer 36, the intermediate layer 37, and the nonmagnetic electrically conductive layer 45 construct the multilayer part 40 of the first embodiment, whereby a large magnetoresistance change can be obtained. Also, as compared with the first embodiment, the second layer 38 in the pinned layer 42 and the nonmagnetic electrically conductive layer 45 are combined together, which can simplify the manufacturing process and reduce the thickness of the sensor part of the thin-film magnetic head.

Though the invention achieved by the inventor is specifically explained according to embodiments, the present invention is not limited to the above-mentioned embodiments. For example, a dual spin valve structure may be employed so as to provide both sides of a free layer with respective pinned layers, each of which is formed with the above-mentioned multilayer part.

The nonmagnetic electrically conductive layer constituting the first and second layers of the multilayer part may be not only Cu but also, for example, one of Al, Ag, Ru, Rh, Hf, Pt, Zn, Ti, and Cr or an alloy of at least two kinds thereof. Using these materials can also improve the magnetoresistance ratio.

The magnetoresistive device of the present invention is applicable not only to thin-film magnetic heads, but also to magnetic memories, motion sensors, or other various magnetic sensors and the like.

As explained in the foregoing, the thin-film magnetic head, head gimbal assembly, hard disk drive, and magnetoresistive device in accordance with the present invention can attain a high magnetoresistance ratio.

The basic Japanese Application No. 2003-149,884 filed on May 27, 2003 is hereby incorporated by reference.

What is claimed is:

1. A thin-film magnetic head comprising:
an antiferromagnetic layer;
a pinned layer exchange-coupled to said antiferromagnetic layer so as to have a fixed magnetization direction;
a free layer having a magnetization direction changeable depending on an external magnetic field; and
a nonmagnetic layer disposed between said pinned layer and said free layer;
wherein a sense current flows in a thickness direction of said free layer;
said pinned layer including a multilayer part comprising:
a first layer formed from Cu;
a second layer formed from Cu and disposed closer to said free layer than is said first layer; and
an intermediate layer, disposed between said first and second layers while in contact therewith, comprising a partly oxidized ferromagnetic layer.

2. A thin-film magnetic head according to claim 1, wherein said oxidized part in said intermediate layer of said multilayer part is a ferromagnetic material.

3. A thin-film magnetic head according to claim 1, wherein said intermediate layer of said multilayer part is formed from Fe or FeCo.

4. A thin-film magnetic head according to claim 1, wherein said pinned layer comprises a first ferromagnetic layer exchange-coupled to said antiferromagnetic layer so as to have a fixed magnetization direction while in contact with said antiferromagnetic layer, a second ferromagnetic layer having a magnetization direction opposite from that of said first ferromagnetic layer, and a nonmagnetic spacer layer disposed between said first and second ferromagnetic layers; said multilayer part being included in said second ferromagnetic layer.

5. A thin-film magnetic head according to claim 1, wherein said multilayer part comprises a plurality of multilayer parts.

6. A thin-film magnetic head comprising:
an antiferromagnetic layer;
a pinned layer exchange-coupled to said antiferromagnetic layer so as to have a fixed magnetization direction;
a free layer having a magnetization direction changeable depending on an external magnetic field; and
a nonmagnetic layer made of Cu and disposed between said pinned layer and said free layer;
wherein a sense current flows in a thickness direction of said free layer;
said pinned layer including a multilayer part comprising:
a first layer formed from Cu; and
an intermediate layer, disposed between said first layer and nonmagnetic layer while in contact therewith, comprising a partly oxidized ferromagnetic layer.

7. A head gimbal assembly comprising a thin-film magnetic head;
said thin-film magnetic head comprising:
an antiferromagnetic layer;
a pinned layer exchange-coupled to said antiferromagnetic layer so as to have a fixed magnetization direction;

a free layer having a magnetization direction changeable depending on an external magnetic field; and a nonmagnetic layer disposed between said pinned layer and said free layer;

wherein a sense current flows in a thickness direction of said free layer;

said pinned layer including a multilayer part comprising:

a first layer formed from Cu;

a second layer formed from Cu and disposed closer to said free layer than is said first layer; and an intermediate layer, disposed between said first and second layers while in contact therewith, comprising a partly oxidized ferromagnetic layer.

8. A hard disk drive comprising a thin-film magnetic head; said thin-film magnetic head comprising:

an antiferromagnetic layer;

a pinned layer exchange-coupled to said antiferromagnetic layer so as to have a fixed magnetization direction;

a free layer having a magnetization direction changeable depending on an external magnetic field; and a nonmagnetic layer disposed between said pinned layer and said free layer;

wherein a sense current flows in a thickness direction of said free layer;

said pinned layer including a multilayer part comprising:

a first layer formed from Cu;

a second layer formed from Cu and disposed closer to said free layer than is said first layer; and an intermediate layer, disposed between said first and second layers while in contact therewith, comprising a partly oxidized ferromagnetic layer.

9. A thin-film magnetic head comprising:

an antiferromagnetic layer;

a pinned layer exchange-coupled to said antiferromagnetic layer so as to have a fixed magnetization direction;

a free layer having a magnetization direction changeable depending on an external magnetic field; and a nonmagnetic layer disposed between said pinned layer and said free layer;

wherein a sense current flows in a thickness direction of said free layer;

said pinned layer including a multilayer part comprising:

a first layer formed from a nonmagnetic electrically conductive layer;

a second layer formed from a nonmagnetic electrically conductive layer and disposed closer to said free layer than is said first layer; and an intermediate layer, disposed between said first and second layers while in contact therewith, comprising a partly oxidized ferromagnetic layer.

10. A magnetoresistive device comprising:

an antiferromagnetic layer;

a pinned layer exchange-coupled to said antiferromagnetic layer so as to have a fixed magnetization direction;

a free layer having a magnetization direction changeable depending on an external magnetic field; and a nonmagnetic layer disposed between said pinned layer and said free layer;

wherein a sense current flows in a thickness direction of said free layer;

said pinned layer including a multilayer part comprising:

a first layer formed from a nonmagnetic electrically conductive layer;

a second layer formed from a nonmagnetic electrically conductive layer and disposed closer to said free layer than is said first layer; and an intermediate layer, disposed between said first and second layers while in contact therewith, comprising a partly oxidized ferromagnetic layer.

* * * * *